(12) United States Patent
Kluempke (10) Patent No.: US 7,070,457 B2
(45) Date of Patent: Jul. 4, 2006

(54) TELECOMMUNICATIONS CONNECTOR

(75) Inventor: Shari K. Kluempke, Burnsville, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 10/200,060

(22) Filed: Jul. 19, 2002

(65) Prior Publication Data

US 2004/0014368 A1    Jan. 22, 2004

(51) Int. Cl.
*H01R 13/502* (2006.01)
(52) U.S. Cl. ...................... 439/687; 439/906
(58) Field of Classification Search ............. 439/668, 439/731, 675, 848, 263, 901, 904, 906, 687, 439/696
See application file for complete search history.

(56) References Cited

U.S. PATENT DOCUMENTS

| | | | |
|---|---|---|---|
| 3,573,716 A | 4/1971 | Garver | |
| 3,852,700 A | 12/1974 | Haws | |
| 3,989,343 A | 11/1976 | Lucius et al. | |
| 4,073,563 A | 2/1978 | Bailey et al. | |
| 4,274,691 A | 6/1981 | Abernethy et al. | |
| 4,406,509 A | 9/1983 | Jagen | |
| 4,541,036 A | 9/1985 | Landries et al. | |
| 4,556,264 A | 12/1985 | Tanaka | |
| 4,687,291 A | 8/1987 | Stape et al. | |
| 4,698,025 A | 10/1987 | Silbernagel et al. | |
| 4,749,968 A | 6/1988 | Burroughs | |
| 4,768,961 A | 9/1988 | Lau | |
| 4,815,104 A | 3/1989 | Williams et al. | |
| 4,836,804 A | 6/1989 | London et al. | |
| 4,971,571 A | 11/1990 | Puerner | |
| 4,998,889 A | 3/1991 | Moly | |
| 5,147,992 A | 9/1992 | Eriksen et al. | |
| 5,214,673 A | 5/1993 | Morgenstern et al. | |
| 5,233,501 A | 8/1993 | Allen et al. | |
| 5,246,378 A | 9/1993 | Seiceanu | |
| 5,295,859 A * | 3/1994 | Kawai et al. | 439/455 |
| 5,348,491 A | 9/1994 | Louwagie et al. | |
| 5,366,388 A | 11/1994 | Freeman et al. | |
| 5,413,494 A | 5/1995 | Dewey et al. | |
| 5,467,062 A | 11/1995 | Burroughs | |
| 5,538,438 A | 7/1996 | Orlando | |
| 5,577,924 A | 11/1996 | Louwagie | |
| 5,913,701 A * | 6/1999 | Olson et al. | 439/668 |
| 5,947,771 A | 9/1999 | Bethurum | |
| 6,019,521 A | 2/2000 | Manning et al. | |
| 6,045,378 A | 4/2000 | Follingstad | |
| 6,132,259 A | 10/2000 | Chapman et al. | |
| 6,241,562 B1 | 6/2001 | Benda et al. | |

(Continued)

FOREIGN PATENT DOCUMENTS

WO    WO 93/20600    10/1993

(Continued)

OTHER PUBLICATIONS

Brochure, "Video Signal Distribution Products," *ADC Telecommunications*, pp. 47 (10/190).

*Primary Examiner*—James R. Harvey
(74) *Attorney, Agent, or Firm*—Merchant & Gould PC (57) ABSTRACT

The present disclosure relates to a connector having a connector body. A housing mounts over the connector body. The housing is adapted for securing the connector to another element such as a piece of telecommunications equipment.

26 Claims, 10 Drawing Sheets

U.S. PATENT DOCUMENTS

| | | |
|---|---|---|
| 6,287,149 B1 | 9/2001 | Elkhatib et al. |
| 6,328,608 B1 | 12/2001 | Olson et al. |
| 6,352,444 B1 | 3/2002 | Yuzawa |
| 6,409,534 B1 * | 6/2002 | Weisz-Margulescu ....... 439/367 |
| 6,450,829 B1 * | 9/2002 | Weisz-Margulescu ....... 439/352 |
| 6,524,131 B1 | 2/2003 | Schmidt et al. |
| 6,533,616 B1 * | 3/2003 | Johnsen et al. ............. 439/668 |
| 6,543,626 B1 | 4/2003 | Mendoza |
| 6,589,062 B1 * | 7/2003 | Ogren et al. ................ 439/188 |
| 6,616,477 B1 * | 9/2003 | Chang ........................ 439/465 |
| 6,830,486 B1 | 12/2004 | Norris et al. |
| 6,830,487 B1 | 12/2004 | Kluempke |
| 6,846,195 B1 * | 1/2005 | Annequin ................... 439/352 |
| 2002/0076964 A1 | 6/2002 | Weisz-Margulescu |
| 2003/0013346 A1 | 1/2003 | Perrone et al. |
| 2004/0014365 A1 * | 1/2004 | Norris et al. ............... 439/668 |
| 2004/0014368 A1 * | 1/2004 | Kluempke ................. 439/687 |

FOREIGN PATENT DOCUMENTS

| | | |
|---|---|---|
| WO | WO 94/08429 | 4/1994 |
| WO | WO 98/38703 | 9/1998 |
| WO | WO 00/30219 | 5/2000 |

* cited by examiner

TELECOMMUNICATIONS CONNECTOR

FIELD OF THE INVENTION

The present invention relates generally to electrical connectors. More particularly, the present invention relates to telecommunications connectors.

BACKGROUND OF THE INVENTION

In the telecommunications industry, connectors are used to interconnect cables to pieces of telecommunications equipment or to other circuitry (e.g., switches). U.S. Pat. No. 5,913,701, which is incorporated herein by reference, shows connectors 60 and 60' mounted to the back wall of a digital cross-connect (DSX) module. In addition to modules, connectors are also frequently mounted to other structures such as telecommunications panels, frames, chassis, PC boards or other telecommunications components.

SUMMARY

The present disclosure describes representative embodiments that include examples of how a number of inventive concepts can be practiced. It will be appreciated that the inventions can be used together or separately from one another. It will further be appreciated that the examples embodying the inventions are merely illustrative, and that variations can be made with respect to the depicted examples without departing from the broad scope of the inventions.

An example embodiment disclosed herein relates to a connector having a connector body. The embodiment also includes a housing that mounts over the connector body. The housing is adapted for securing the connector to another element such as a piece of telecommunications equipment.

BRIEF DESCRIPTION OF THE DRAWINGS

The accompanying drawings, which are incorporated in and constitute a part of the specification, illustrate various embodiments that are examples of how certain inventions can be put into practice. A brief description of the drawings is as follows.

DETAILED DESCRIPTION

FIGS. 1–4 illustrate a connector 150 having features that are examples of how various inventive concepts disclosed herein can be practiced. The connector 150 includes a bulkhead 300 and a center conductor 316 supported within the bulkhead 300. The bulkhead 300 can also be referred to as a "conductor support" since it functions to hold the conductor 316, or a "connector body." A housing 320 mounts about the bulkhead 300. As will be described below, the housing 320 includes structure for securing the connector 150 to a piece of telecommunications equipment or other structure.

A. Bulkhead

Figure 1:
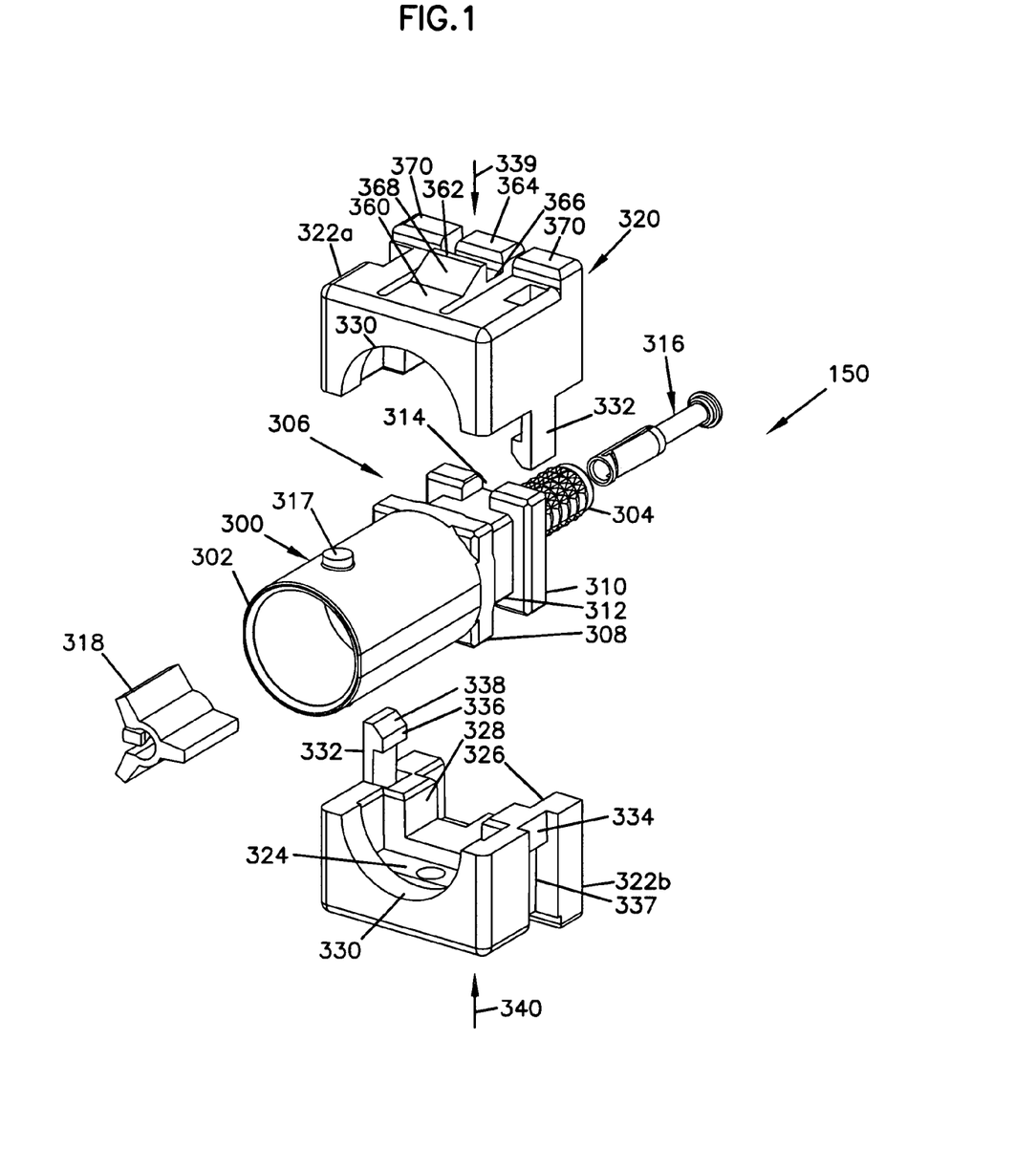
FIG. 1 is an exploded view of a connector having features that are examples of how various inventive concepts disclosed herein can be practiced.

Referring to FIG. 1, the bulkhead 300 of the connector 150 includes a connector sleeve 302 and a crimp-supporting sleeve 304. The sleeves 302, 304 are positioned at opposite ends of the bulkhead 300. The connector sleeve 302 is configured to provide a connection with a BNC type connector (Bayonet Normalized Connector). It will be appreciated that the sleeve can have different configurations to correspond to different styles of connectors such as TNC style connectors (Threaded Normalized Connectors) or 1.6/5.6 style connectors. The crimp-supporting sleeve 304 includes structure for enhancing a crimp (e.g., knurling, ridges, surface roughness, bumps, etc.).

The bulkhead 300 also includes a housing mount 306 positioned between the sleeves 302, 304. Preferably the housing mount 306 is integrally or unitarily formed as a single piece with the main body of the bulkhead 300. The housing mount 306 includes a first flange 308 positioned adjacent the connector sleeve 302 and a second flange 310 positioned adjacent the crimp-supporting sleeve 304. The flanges 308, 310 project outwardly from the main body of the bulkhead 300. Each of the flanges 308, 310 has a generally square configuration. A gap 312 is located between the flanges 308, 310. Flange 310 includes top and bottom key notches 314 (only the top notch is visible in FIG. 1).

Figure 4:
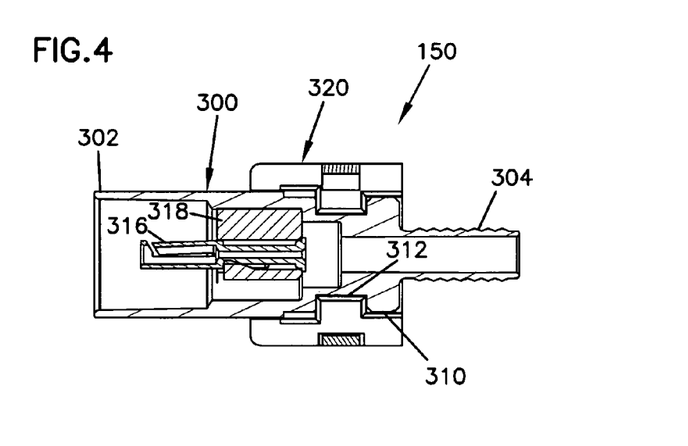
FIG. 4 is a cross-sectional view taken along section line 4—4 of FIG. 2.

Referring to FIG. 4, the center conductor 316 of the connector 150 preferably mounts within the connector sleeve 302. A dielectric spacer 318 is provided for centering the center conductor 316 within the connector sleeve 302. When a BNC conventional connector (not shown) is coupled to the connector 150, a center pin of the BNC connector fits within center conductor 316, an outer conductor sleeve presses within the sleeve 302, and a twist collar fits over sleeve 302 and receives tabs 317 of the bulkhead 300 to lock the connectors together. The sleeve 304 is hollow for receiving a cable terminated to the center conductor 316.

In one embodiment, the bulkhead 300 is constructed of a metal material such as zinc die cast alloy. However, it will be appreciated that other material can also be used.

B. Housing

Referring again to FIG. 1, the housing 320 of the connector 150 includes housing pieces 322a, 322b. To promote manufacturing efficiency, it is preferred for the housing pieces 322a, 322b to have identical configurations. FIGS. 5–10 show various views of one of the housing pieces 322a. Separate drawings for the housing piece 322b are not provided, since the two pieces are identical. In other embodiments, the housing pieces need not be identical. Further, in still other embodiments, more than two pieces can be provided, or the housing can be formed as a single, integral piece about the bulkhead 300. In one embodiment, the housing is made of a dielectric plastic material such as polycarbonate. However, other materials could also be used.

Figures 5, 6:
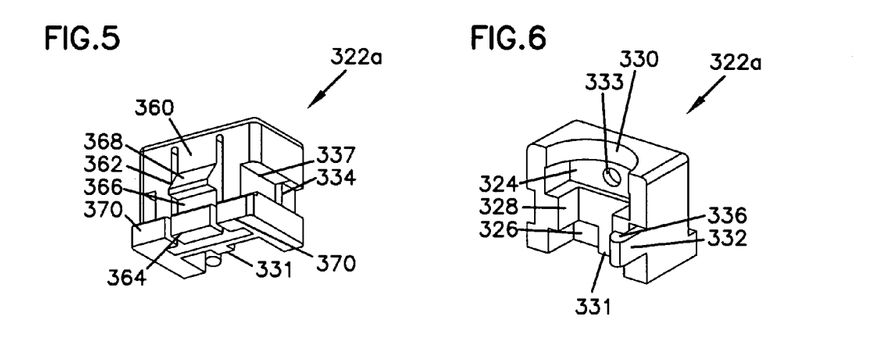
FIG. 5 is a perspective view of the outer portion of one of the connector housing pieces of FIG. 1.
FIG. 6 is a perspective view of the interior side of the housing piece of FIG. 5.
Figure 7:
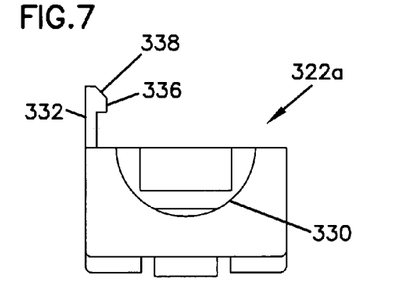
FIG. 7 is a top view of the housing piece of FIG. 6.
Figure 10:
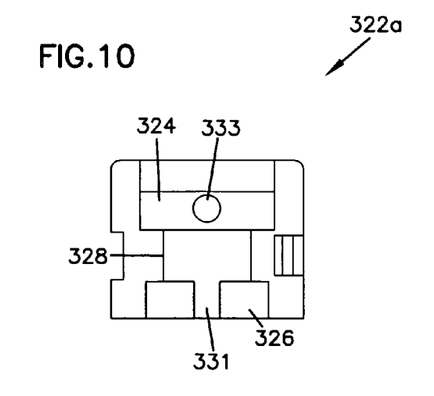
FIG. 10 is a front view of the housing piece of FIG. 6.

The housing pieces 322a, 322b preferably have internal configurations that complement the outer configuration of the housing mount 306. For example, as shown in FIGS. 1, 6 and 10, each of the housing pieces 322a, 322b includes first and second recesses 324, 326 for respectively receiving the first and second flanges 308, 310 of the bulkhead 300. In the depicted embodiment, the recesses 324, 326 are generally square so as to match the shape of the flanges 310, 312. Each of the housing pieces 322a, 322b also includes a shoulder 328 positioned between the recesses 324, 326. The shoulder 328 is sized to fit within the gap 312 located between the flanges 308, 310. While the flanges and recesses are depicted as being square, it will be appreciated that other shapes could also be used.

Figure 8:
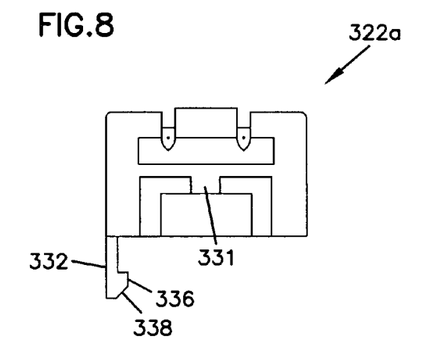
FIG. 8 is a bottom view of the housing piece of FIG. 6.
Figure 9:
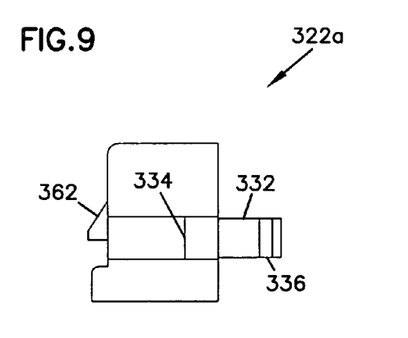
FIG. 9 is a left side view of the housing piece of FIG. 6.

As shown in FIGS. 8 and 10, the housing pieces 322a, 322b also include key members 331 adapted to fit within the key notches 314 of the bulkhead 300 when the housing is mounted over the bulkhead 300. Additionally, as shown in FIGS. 6 and 10, a core hole 333 is defined at the recess 324. The hole 333 facilitates forming the pieces 322a, 322b using a molding process such as a plastic molding process.

Referring to FIGS. 1, 2, 6 and 7, each of the housing pieces 322a, 322b includes a semi-circular recess 330 having a diameter that matches an outer diameter of the connector sleeve 302 of the bulkhead 300. The housing pieces 322a, 322b are also provided with structure for snap-fitting the pieces together. For example, the housing pieces 322a, 322b are also provided with resilient cantilever arms 332 (i.e. latches) and retaining shoulders 334. As shown in FIG. 1, the cantilever arms 332 and the retaining shoulders 334 are positioned on opposite sides of each housing piece 332a, 332b. Each cantilever arm 332 includes a free end including a retaining tab 336. The retaining tabs 336 are shown including ramp surfaces 338. The retaining shoulders 334 are preferably positioned within exterior slots 337 that are generally parallel with respect to the resilient cantilever arms 332.

Figure 2:
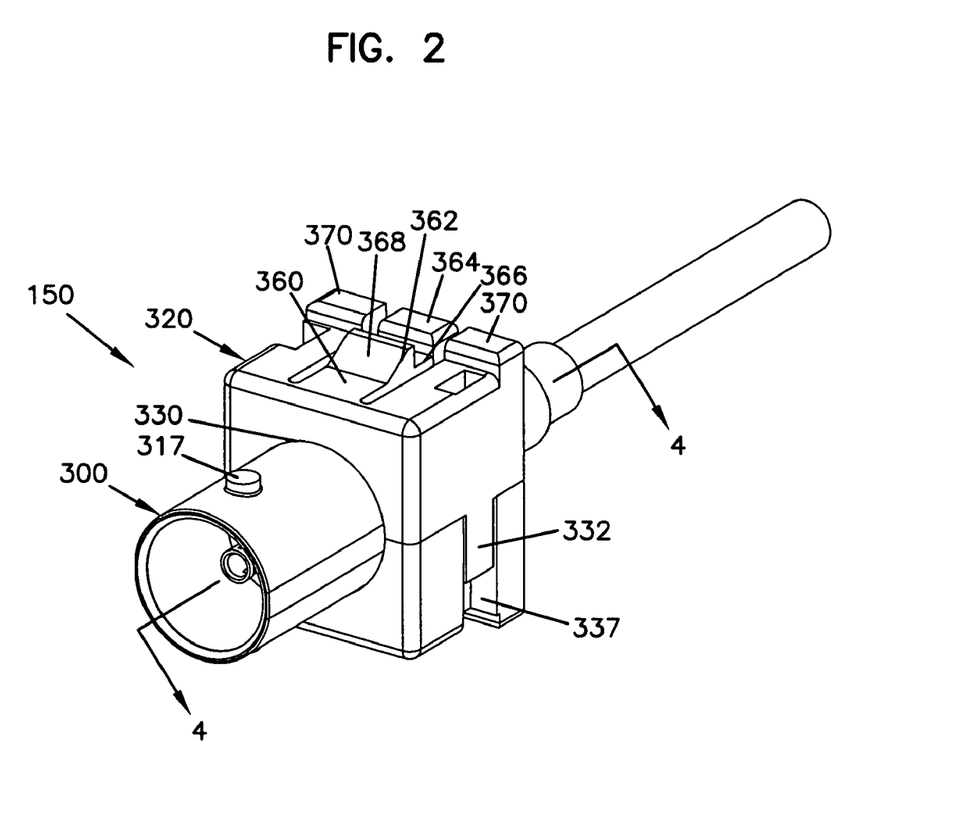
FIG. 2 is an assembled view of the connector of FIG. 1.
Figure 3:
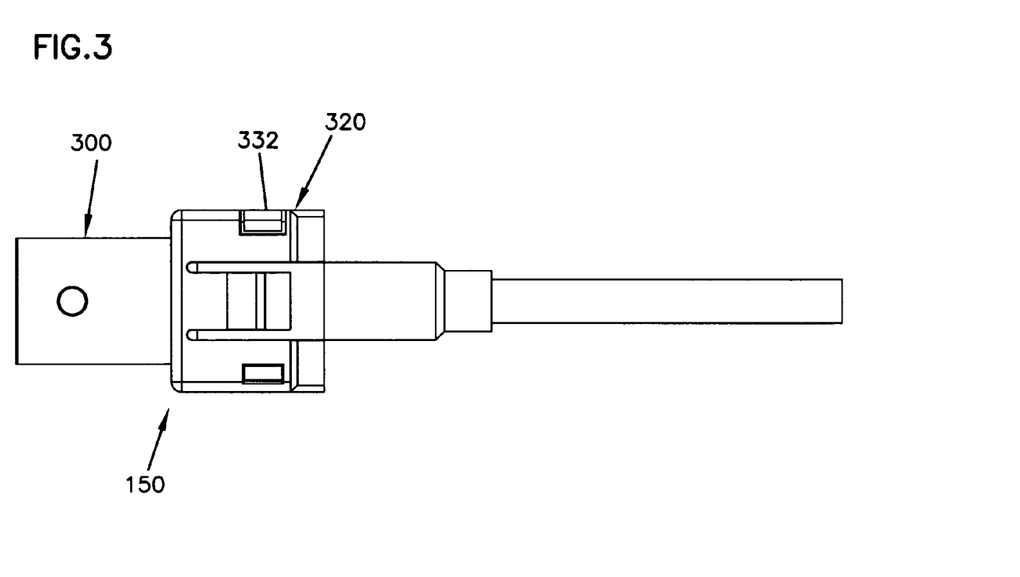
FIG. 3 is a top view of the connector of FIG. 2.

To mount the housing 320 on the bulkhead 300, the housing piece 322a is inserted downwardly over the housing mount 306 as shown by arrow 339 in FIG. 1, and the housing piece 322b is inserted upwardly over the housing mount 306 as indicated by arrow 340 in FIG. 1. As the housing pieces 322a, 322b are inserted into place, the flanges 308, 310 fit into recesses 324, 326 and the shoulders 328 fit into gap 312. Also, the key members 331 fit within key notches 314. When the housing pieces 322a, 322b are pushed together, the resilient cantilever arms 332 slide into the corresponding exterior slot 337 provided on the opposite housing piece. During the insertion process, the resilient cantilever arms 332 flex outwardly, with the assistance of ramp surfaces 338, as the retaining tabs 336 enter the exterior slots 337. When the retaining tabs 336 move past the retaining shoulders 334, the inherent elasticity of the cantilever arms 332 causes the cantilever arms 332 to snap into a locked position. In the locked position, the retaining tabs 336 oppose or engage the retaining shoulders 334 to prevent the housing pieces 322a, 322b from being disconnected. If it is desired to disconnect the housing pieces 322a, 322b, the cantilever arms 332 can be manually flexed in an outward direction thereby allowing the housing pieces 322a, 322b to be pulled apart. FIG. 2 shows the resilient cantilever arms 332 snapped into the locking position such that the housing pieces 322a, 322b are coupled about the bulkhead 300.

As used herein, the phrase "snap-fit connection" means a connection provided by a resilient member that flexes or deforms past a retaining structure and moves to a locking or retaining position by the inherent flexibility or elasticity of the resilient member. In the above described embodiment, the arms 332 move or "snap" past the shoulders 334 by the inherent bias of the arms 332. The term snap-fit connection is not limited to resilient arms, but includes any structure (e.g., bumps, tabs, shoulders, etc.) that is deformed during insertion and moves to a retaining position by the inherent elasticity of the structure. In other embodiments, the housing pieces 322a, 322b can be coupled together by other types of connection techniques such as press-fit connections or adhesive connections.

The complementary relationship between the interior of the housing 320 and the housing mount 306 of the bulkhead 300 is preferably configured to prevent relative rotation between the housing 320 and the bulkhead 300. For example, the opposing flats of the flanges 308, 310 and the recesses 324, 326 prevent relative rotation between the housing 320 and the bulkhead 300. Other configurations such as interlocks or engaging, non-circular shapes could also be used.

The complementary shape of the interior of the housing 320 and housing mount 306 also prevents the housing 320 from being axially slid from the bulkhead 300. For example, when the housing 320 is mounted about the bulkhead 300, shoulders 328 are captured between flanges 308, 310 such that axial movement of the housing 320 relative the bulkhead 300 is limited or prevented.

Figure 11:
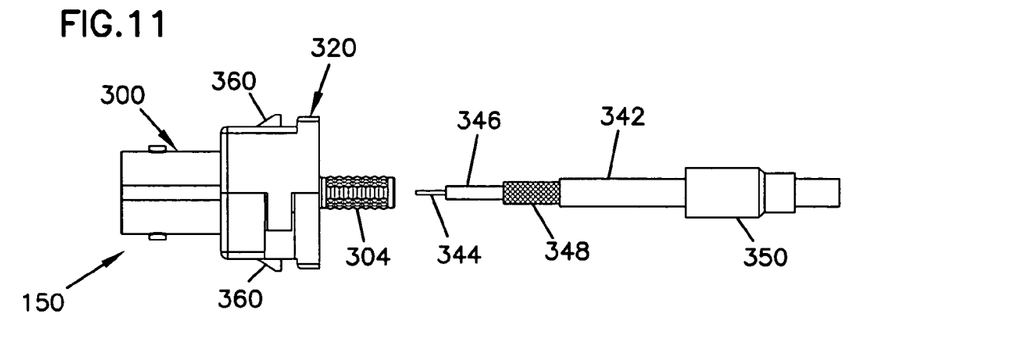
FIGS. 11–13 show a sequence of steps for terminating a cable to the connector of FIG. 1.
Figure 12:
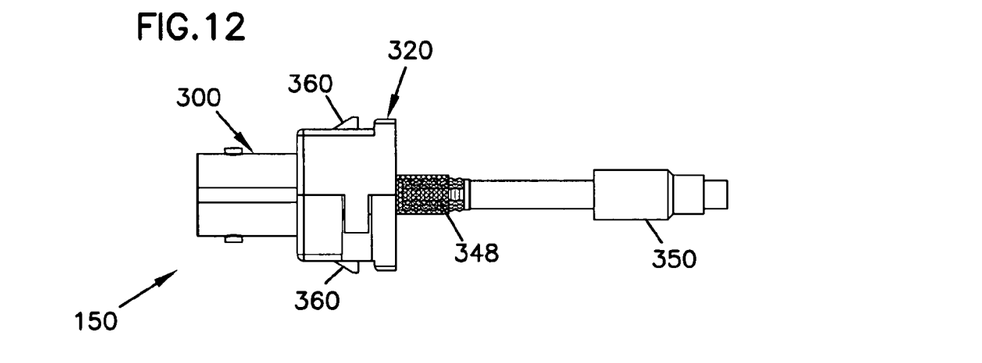
Figure 13:
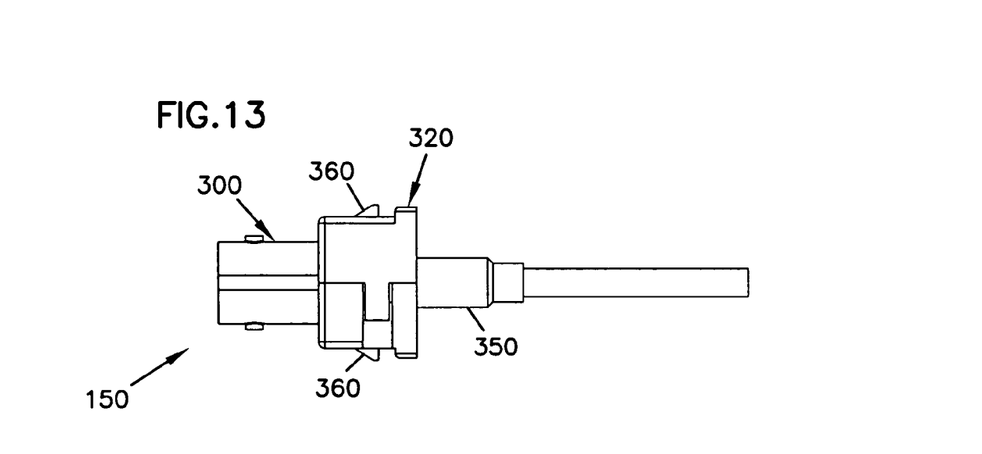
Figure 14:
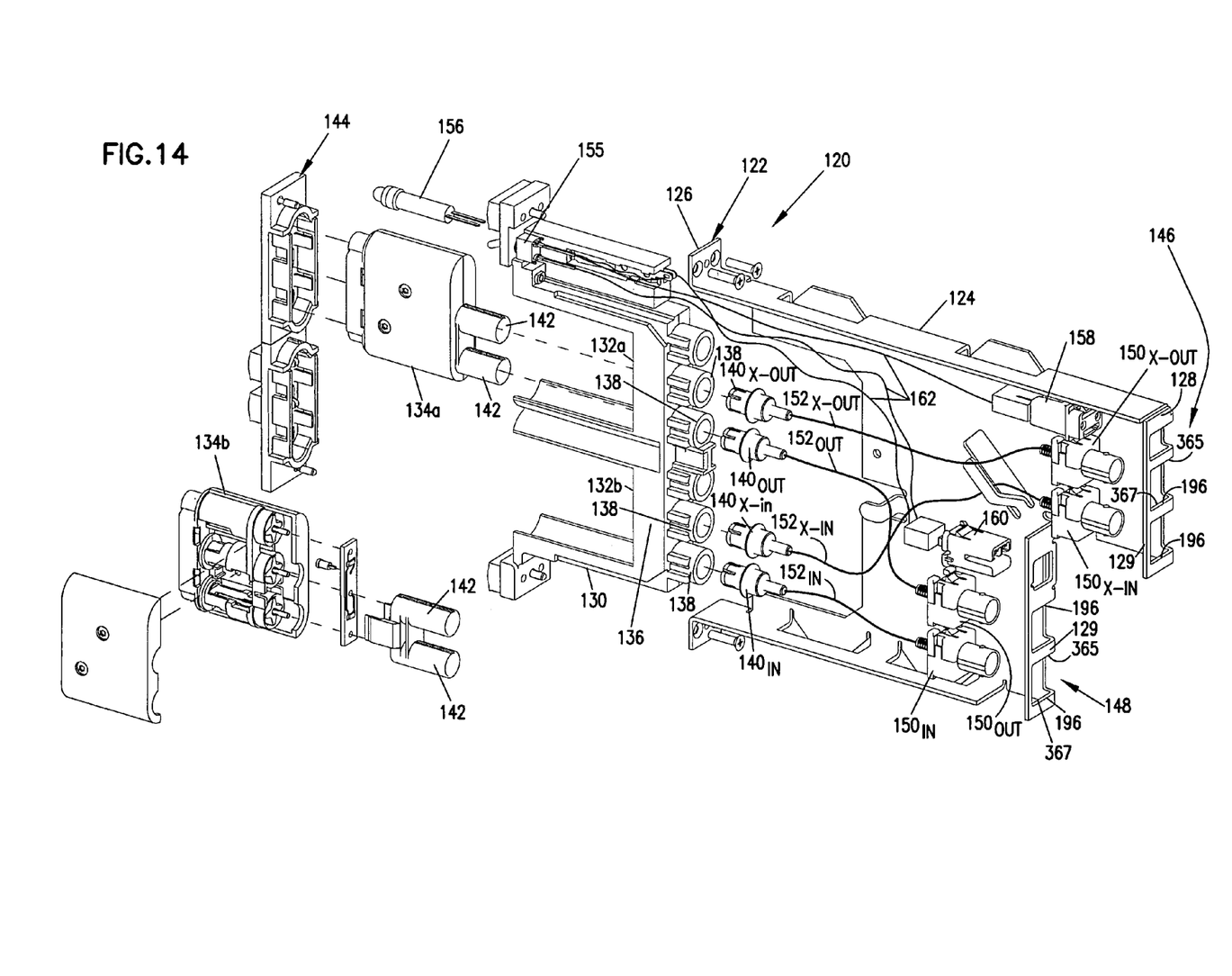
FIG. 14 illustrates a back module incorporating rear connectors having the same configuration as the connector of FIG. 1.

The housing 320 of the connector preferably includes structure for providing a snap-fit connection between the connector 150 and a piece of telecommunications equipment (e.g., a panel or a jack module such as jack module 120 shown in FIG. 14). As shown in FIGS. 11–13, the housing 320 includes top and bottom resilient cantilever arms 360. As best shown in FIGS. 1, 2 and 5, each cantilever arm 360 includes first and second retaining tabs 362 and 364 that are separated by a gap 366. The second tab 364 is located at the free end of the arm 360, and the first tab 362 is located between the second tab 364 and the base end of the arm 360. The first tab 362 includes a ramp surface 368. The housing 320 also includes fixed retaining shoulders 370 located on opposite sides of each of the second tabs 364.

In the depicted embodiment, the top and bottom sides of the housing are shown having identical configurations. However, in other embodiments, different snap-fit configurations can be provided on the top and bottom sides of the connector. Further, in some embodiments, only one snap-fit structure may be provided. It will be appreciated that the snap-fit structure could be provided on the top, the bottom or either side of the housing 320.

C. Cable Termination

To terminate a cable 342 within the connector 150, the cable 342 is preferably stripped as shown in FIG. 11. In the stripped configuration, the cable 342 includes an exposed central wire 344, an exposed cladding portion 346, and an exposed reinforcing braid 348. The exposed wire 344 is preferably crimped within the center conductor 316. The center conductor 316 is positioned within the bulkhead 300 of the connector 150 as shown in FIG. 4. To mechanically secure the cable 342 to the connector 150, the braided portion 348 is inserted over the crimp-supporting sleeve 304 of the bulkhead 300 as shown in FIG. 12. A ferrule 350 is then crimped over the braid 348, as shown in FIG. 13, to hold the braided portion 348 in place.

D. Jack Module

FIG. 14 illustrates a jack module 120 that is an example of a piece of telecommunications equipment to which the connector 150 can be secured. The jack module 120 includes a housing 122 having a main frame 124. The main frame 124 includes a front end 126 positioned opposite from a rear end 128. A front jack mount 130 is mounted at the front end 126 of the main frame 124. The front jack mount 130 includes pockets 132a, 132b for respectively receiving jack devices 134a, 134b. Front ends of the pockets 132a, 132b are open, and back ends of the pockets 132a, 132b are closed by a rear wall 136 of the front jack mount 130. Connector mounts 138 are defined within the rear wall 136. The connector mounts 138 are adapted for receiving jack interface connectors $140_{IN}$, $140_{OUT}$, $140_{X-IN}$, $140_{X-OUT}$ (collectively referred to with reference number 140). When the jack devices 134a, 134b are inserted within the pockets 132a, 132b, connectors 142 corresponding to the jack devices 134a, 134b interconnect with the jack interface connectors 140. The front side of the front jack mount 130 is enclosed by a removable front cover 144.

Referring still to FIG. 14, the rear end 128 of the main frame 124 includes a rear wall 129 having upper and lower connector mounting locations 146, 148. The lower mounting location 148 is inset relative to the upper mounting location 146. Rear connectors $150_{X-OUT}$, $150_{X-IN}$, $150_{OUT}$ and $150_{IN}$ (collectively referred to with reference number 150) are mounted at the rear end 128. For example, connectors $150_{X-OUT}$ and $150_{X-IN}$ are mounted at the upper mounting location 146, and connectors $150_{OUT}$ and $150_{IN}$ are mounted at the lower mounting location 148. Connectors $150_{X-OUT}$ and $150_{X-IN}$ are adapted for providing cross-connections between modules while the connectors $150_{OUT}$ and $150_{IN}$ are adapted for providing connections to network elements (e.g., telecommunications equipment). As shown in FIG. 14, cables $152_{X-OUT}$, $152_{X-IN}$, $152_{IN}$ and $152_{OUT}$ (collectively referred to with reference number 152) electrically connect the jack devices 134a, 134b to the rear connectors 150. For example, cable $152_{X-OUT}$ connects connector $150_{X-OUT}$ connector $140_{X-OUT}$, cable $152_{X-IN}$ connects connector $150_{X-IN}$ connector $140_{X-IN}$, cable $152_{OUT}$ connects connector $150_{OUT}$ to connector $140_{OUT}$, and cable $152_{IN}$ connects connector $150_{IN}$ to connector $140_{IN}$.

Referring still to FIG. 14, the jack module 120 is also preferably equipped with a tracer lamp circuit. The tracer lamp circuit includes a tracer lamp such as a light emitting diode (LED) 156 mounted at the front of the module 120. A tracer lamp switch 155 is positioned adjacent the LED 156. The tracer lamp circuit also includes a pin jack housing 158 mounted at the upper mounting location 146 and a card edge connector 160 mounted at the lower mounting location 148. A harness 162 electrically connects the card edge connector 160, the pin jack housing 158, and the switch 155 to the LED 156. It will be appreciated that the pin jack housing 158 is adapted for connecting the tracer lamp circuit 154 to the tracer lamp circuit of a cross-connected jack module, and the card edge connector 160 is adapted for connecting the tracer lamp circuit 154 to power and ground.

The jack module is also disclosed in U.S. application Ser. No. 10/199,981 entitled Digital Switching Cross-Connect Module, which has attorney docket No. 2316.1362US01 and was filed on a date concurrent herewith, and which is hereby incorporated by reference in its entirety.

E. Connector Mounting Technique

Referring to FIG. 14, the connectors 150 are connected to the rear wall 129 of the jack module 120 by inserting the housings rearwardly through openings 196. As the connectors 150 are inserted rearwardly through the openings 196, the ramped surfaces 368 of the top and bottom tabs 362 contact top and bottom edges 365, 367 that define the openings 196. The contact between the ramped surfaces 368 and the top and bottom edges 365, 367 of the openings 196 causes the cantilever arms 360 to flex inwardly. After the first tabs 362 have moved completely through the openings 196, the cantilever arms 360 snap outwardly such that the top and bottom edges 365, 367 are captured in the gap 366 between the first and second tabs 362, 364. As so positioned, the second tabs 364 as well as the fixed retaining shoulders 370 engage the front side of the rear wall 129, and the first tabs 362 engage the back side of the rear wall 129. By flexing the cantilever arms inwardly while pushing the connectors 150 in a forward direction, the connectors 150 can be removed from the openings 196.

The depicted connector embodiment is adapted to be snap-fit into the openings 196 by pushing the connector in a rearward direction. It will be appreciated that in other embodiments, the snap-fit configuration can be modified to allow the connectors to be inserted in a forward direction from the rear side of the jack module.

F. Alternative Configurations

Figure 15:
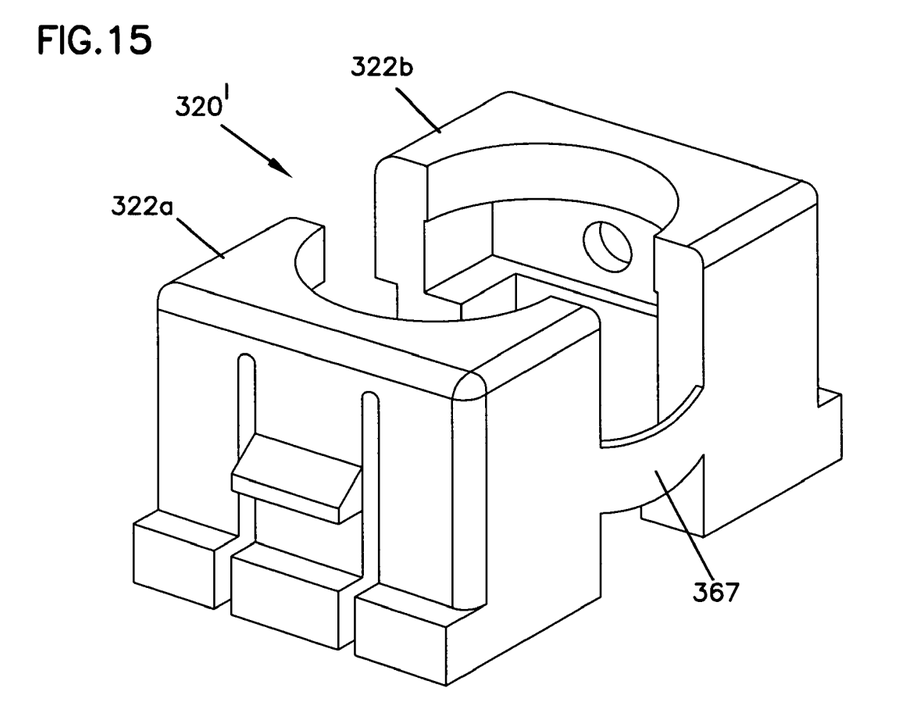
FIG. 15 is a perspective view of an alternative connector having features that are examples of how various inventive concepts disclosed herein can be practiced.

FIG. 15 shows an alternative housing 320' adapted to fit over bulkhead 300. The housing 320' has the same configuration as the housing 320, except pieces 322a and 322b are jointed by a living hinge 367.

Figure 16A:
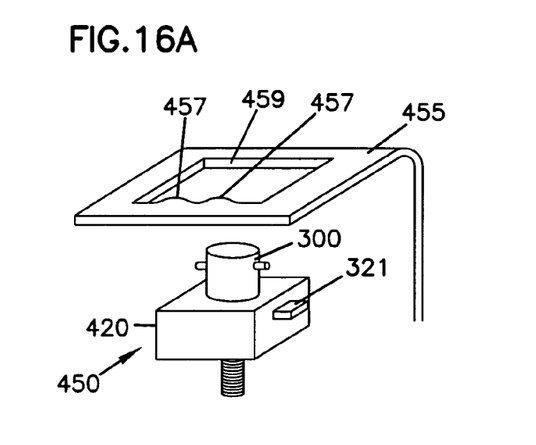
FIGS. 16A–16C show a sequence of steps for inserting another alternative connector having features that are examples of how various inventive concepts disclosed herein can be practiced.
Figure 16B:
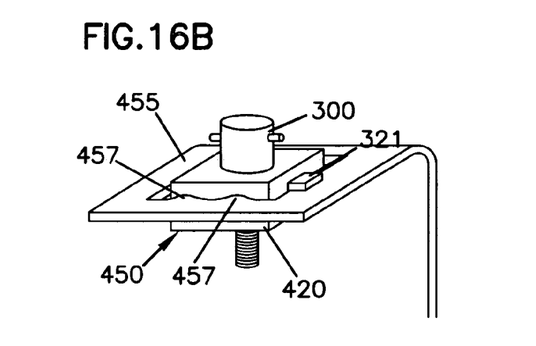
Figure 16C:
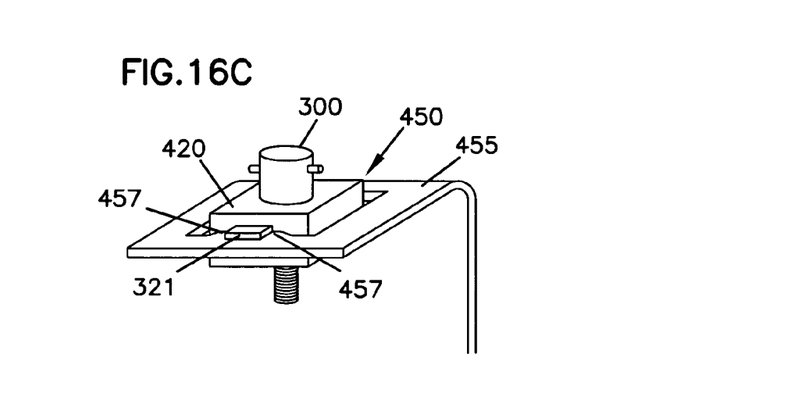

FIGS. 16A–16C show an alternative connector 450 having a housing 420 adapted to mount over bulkhead 300. The housing 420 includes a modified snap-fit structure for connecting the connector 450 to a piece of telecommunications equipment 455. The modified snap fit structure includes a bump or tab 321 that projects outwardly from the main body of the housing 420. The tab 321 cooperates with bumps 457 of the equipment to provide the snap-fit connection. The bumps 457 project into an opening 459 defined by the equipment 455. By inserting the connector 450 into the opening as shown in FIG. 16B, and turning the connector 450 to a position where the tab 321 snaps between the bumps 457, the connector 450 is locked in place. It will be appreciated that either the housing 420 or the opening 459 are preferably rounded (i.e., radiused) to allow for the housing 420 to be rotated within the opening 459.

Figure 17A:
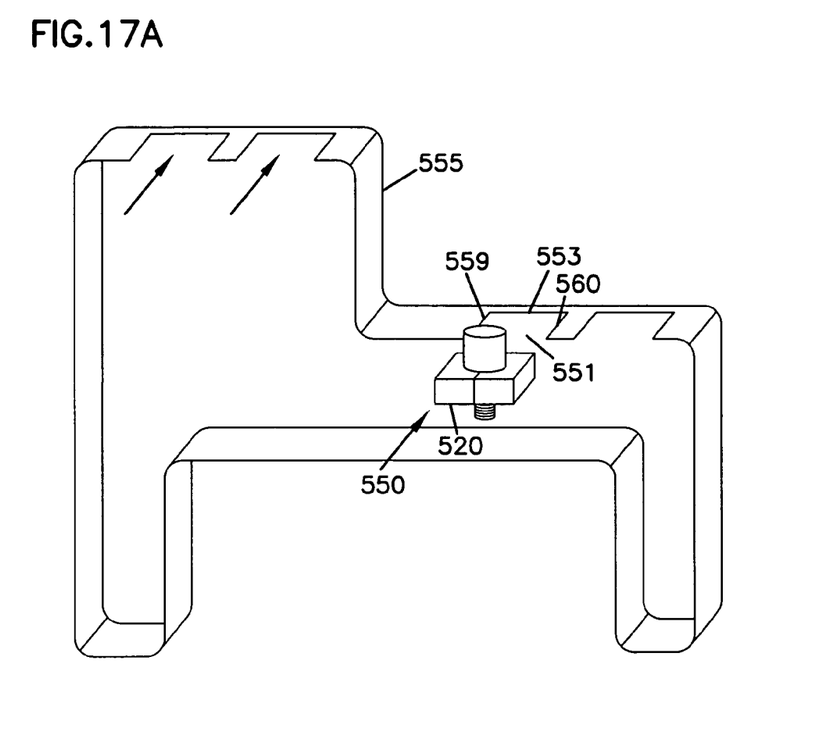
FIGS. 17A and 17B show insertion steps for inserting a further alternative connector having features that are examples of how various inventive concepts disclosed herein can be practiced.
Figure 17B:
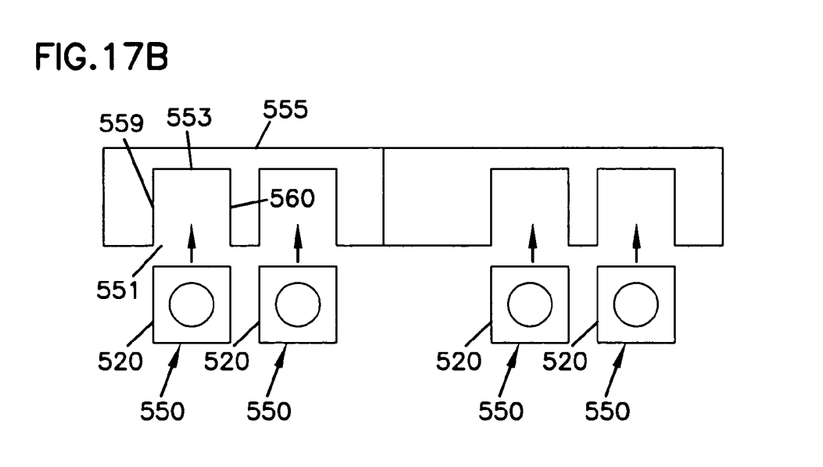

FIGS. 17A and 17B show an alternative connector 550 having a housing 520 that mounts over bulkhead 300. Connector 550 mounts to a piece of telecommunications equipment 555 by sliding the connector 550 though an open side 551 of an opening 553 defined by the equipment 555. The housing 520 can include slots or grooves (not shown) for receiving edges 559, 561 of the opening 553. Alternatively, if the edges 559, 561 are defined by a relatively hard material such as sheet metal, and the housing 520 is made of a softer material such as plastic, grooves need not be provided in the housing 520 as the edges 559, 561 will self-cut grooves in the plastic during the insertion process. To facilitate insertion, in an alternative embodiment, the edges 559, 561 can be angled so as to converge as the edges 559, 561 extend away from the open side 551 of the opening 553.

Figure 18:
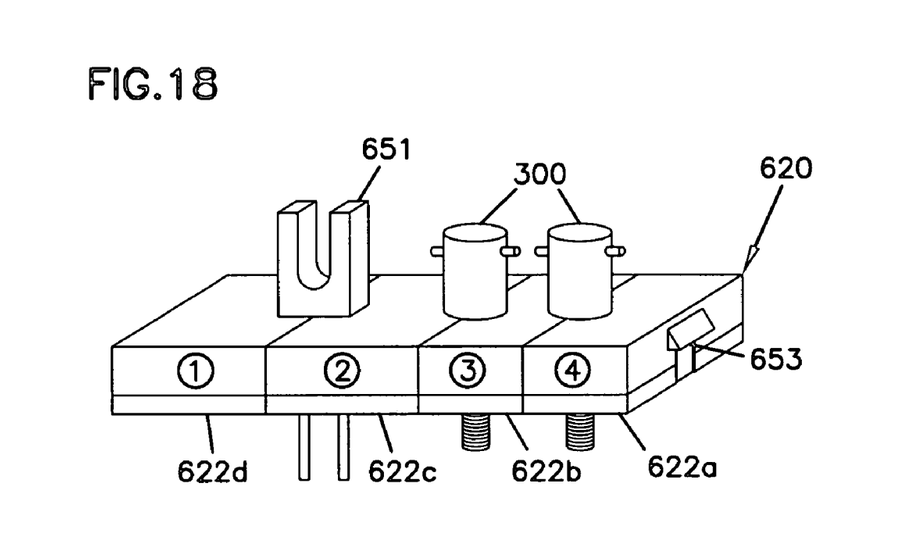
FIG. 18 is a perspective view of a cluster mount connector configuration having features that are examples of how various inventive concepts disclosed herein can be practiced.
Figure 19:
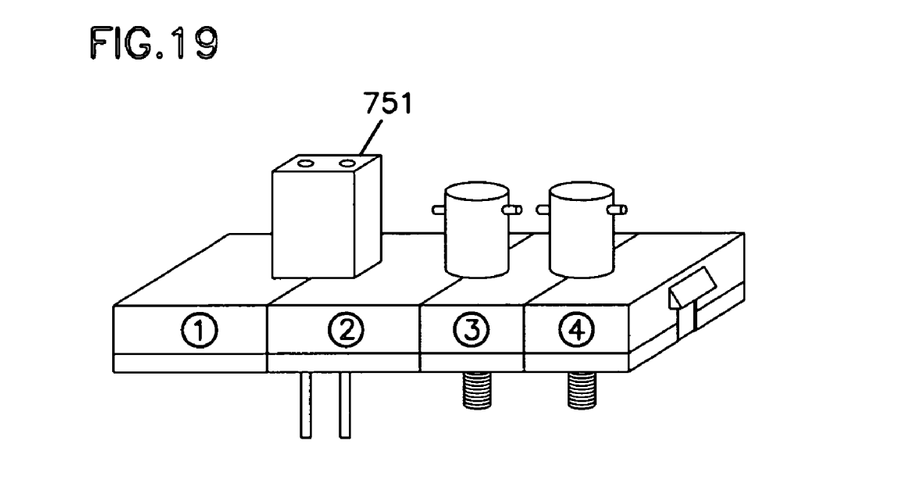
FIG. 19 is a perspective view of another cluster mount configuration having features that are examples of how various inventive concepts disclosed herein can be practiced.

FIG. 18 shows an alternative connector configuration having a cluster mount of connectors. The configuration includes a housing 620 having four interconnected pieces 622a, 622b, 622c and 622d. The pieces 622a–622d can be interconnected by snap-fit connections as previously described. One bulkhead 300 is mounted between pieces 622a and 622b, and another bulkhead 300 is mounted between pieces 622b and 622c. A card edge connector 651 is mounted between pieces 622c and 622d. Pieces 622a and 622d are preferably provided with latches 653 for providing a snap-fit connection with a piece of telecommunications equipment. FIG. 19 shows a cluster configuration that is the same as the one depicted in FIG. 18, except the card edge connector 651 has been replaced with a pin jack 751. It will be appreciated that the number and type of connectors provided in the cluster can be varied.

The connectors disclosed herein is adapted for use in a coaxial system. However, it will be appreciated that the various inventive aspects are applicable to other types of connectors as well. It will be appreciated that many embodiments of the inventions can be made without departing from the spirit and scope of the inventions.

We claim:

1. A connector comprising:
 a connector body including a co-axial connector sleeve, a center conductor electrically isolated from the connector sleeve by a spacer and a housing mount that projects outwardly from the connector sleeve; and
 a housing that mounts over the housing mount of the connector body, the housing mount including structure for preventing the housing from rotating relative to the connector body, the housing mount also including structure for preventing the housing from moving axially relative to the connector body, the housing mount including a projection that is received within a complementary shaped interior recess defined by the housing, the projection comprising a flange, wherein the flange defines a key notch for receiving a key member of the housing, the housing including at least one flexible cantilever arm with a base end and a free end, the free end of the cantilever arm including a tab that protrudes outwardly from the housing for latching the connector within an opening defined by a piece of telecommunications equipment by a snap-fit connection.

2. The connector of claim 1, wherein the flange has at least one flat surface.

3. The connector of claim 2, wherein the flange is generally square.

4. The connector of claim 1, wherein the housing includes at least two pieces that are interconnected about the housing mount.

5. The connector of claim 4, wherein the at least two pieces include a flexible latch member for interconnecting the pieces together by a snap-fit connection.

6. A connector comprising:
 a connector body including a co-axial connector sleeve, a center conductor electrically isolated from the connector sleeve by a spacer and a housing mount that projects outwardly from the connector sleeve; and
 a multi-piece housing that mounts over the housing mount of the connector body such that the housing mount is captured between separate pieces of the housing, the housing mount including a projection that is received within a complementary shaped interior recess defined by the housing, the projection comprising a flange having at least one flat surface, wherein the flange is generally square and wherein the flange defines a key notch for receiving a key member of the housing, the housing including at least one flexible cantilever arm with a base end and a free end, the free end of the cantilever arm including a tab that protrudes outwardly from the housing for latching the connector within an opening defined by a piece of telecommunications equipment by a snap-fit connection.

7. The connector of claim 6, further comprising a key structure for insuring the pieces of the housing are positioned in a desired rotational orientation relative to the connector body.

8. The connector of claim 6, wherein the pieces of the housing each include a flexible latch member for interconnecting the pieces by a snap-fit connection.

9. A connector comprising:
 a connector body including a co-axial connector sleeve, a center conductor electrically isolated from the connector sleeve by a spacer, a crimp-supporting sleeve co-axially aligned with the connector sleeve and a housing mount that projects outwardly from the connector sleeve, the housing mount being located between the connector sleeve and the crimp-supporting sleeve; and
 a two-piece housing that mounts over the housing mount of the connector body, the two-piece housing including two housing pieces secured together by a snap-fit connection, the housing mount including a projection that is received within a complementary shaped interior recess defined by the housing, the projection comprising a flange, wherein the flange defines a key notch for receiving a key member of the housing, the housing including at least one flexible cantilever arm with a base end and a free end, the free end of the cantilever arm including a tab that protrudes outwardly from the housing for latching the connector within an opening defined by a piece of telecommunications equipment by a snap-fit connection.

10. The connector of claim 9, wherein the flange has at least one flat surface.

11. The connector of claim 9, wherein at least one of the pieces of the housing includes a flexible cantilever arm for providing the snap-fit connection between the two pieces.

12. The connector of claim 1, wherein the opening is defined by a wall of the piece of telecommunications equipment.

13. The connector of claim 1, wherein the housing mount is unitarily formed as a single piece with the connector sleeve.

14. The connector of claim 1, wherein the housing includes at least two flexible cantilever arm having tabs for providing the snap-fit connection within the opening defined by the piece of telecommunications equipment, the two cantilever arms being provided on opposing sides of the housing.

15. The connector of claim 2, wherein the projection includes at least two spaced-apart flat faces tat are parallel to each other.

16. The connector of claim 1, wherein the connector body includes a crimp supporting sleeve co-axially aligned with the connector sleeve.

17. The connector of claim 16, wherein the housing mount is located between the crimp-supporting sleeve and the connector sleeve.

18. The connector of claim 1, wherein the housing includes a fixed retaining shoulder that cooperates with the tab to provide the snap-fit connection.

19. The connector of claim 6, wherein the housing mount is unitarily formed as a single piece with the connector sleeve.

20. The connector of claim 6, wherein the housing includes at least two flexible cantilever arms having tabs for providing the snap-fit connection within the opening defined by the piece of telecommunications equipment, the two cantilever arms being provided on opposing sides of the housing.

21. The connector of claim 6, wherein the projection includes at least two spaced-apart flat faces that are parallel to each other.

22. The connector of claim 6, wherein the connector body includes a crimp supporting sleeve co-axially aligned with the connector sleeve, the housing mount being located between the crimp-supporting sleeve and the connector sleeve.

23. The connector of claim 6, wherein the housing includes a fixed retaining shoulder that cooperates with the tab to provide the snap-fit connection.

24. The connector of claim 2, wherein the interior recess defined by the housing includes a non-circular portion for mating with the flange.

25. The connector of claim 6, wherein the interior recess defined by the housing includes a non-circular portion for mating with the flange.

26. The connector of claim 9, wherein the interior recess defined by the housing includes a non-circular portion for mating with the flange.

* * * * *

UNITED STATES PATENT AND TRADEMARK OFFICE
CERTIFICATE OF CORRECTION

PATENT NO. : 7,070,457 B2  Page 1 of 1
APPLICATION NO. : 10/200060
DATED : July 4, 2006
INVENTOR(S) : Kluempke It is certified that error appears in the above-identified patent and that said Letters Patent is hereby corrected as shown below:

Col. 8, line 66, claim 15: "faces tat are parallel" should read --faces that are parallel--

Signed and Sealed this

Twenty-eighth Day of November, 2006

JON W. DUDAS
*Director of the United States Patent and Trademark Office*